(12) United States Patent
Mir et al.

(10) Patent No.: US 7,065,437 B2
(45) Date of Patent: Jun. 20, 2006

(54) CURRENT LIMIT FOR AN ELECTRIC MACHINE

(75) Inventors: Sayeed A. Mir, Saginaw, MI (US); Yulei Chen, Plymouth, MI (US)

(73) Assignee: Delphi Technologies, Inc., Troy, MI (US)

( * ) Notice: Subject to any disclaimer, the term of this patent is extended or adjusted under 35 U.S.C. 154(b) by 207 days.

(21) Appl. No.: 10/645,118

(22) Filed: Aug. 21, 2003

(65) Prior Publication Data

US 2005/0043873 A1 Feb. 24, 2005

(51) Int. Cl.
*B62D 6/00* (2006.01)

(52) U.S. Cl. .......................................... 701/41; 318/434

(58) Field of Classification Search ................... 701/41, 701/36; 318/434, 254, 437, 713, 801, 810, 318/715; 324/503, 207, 207.15
See application file for complete search history.

(56) References Cited

U.S. PATENT DOCUMENTS

| | | | | |
|---|---|---|---|---|
| 5,272,429 A | * | 12/1993 | Lipo et al. .................. | 318/808 |
| 5,965,995 A | * | 10/1999 | Seibel et al. ................ | 318/805 |
| 6,329,781 B1 | * | 12/2001 | Matsui et al. ............... | 318/717 |
| 6,392,418 B1 | | 5/2002 | Mir et al. | |
| 6,429,620 B1 | * | 8/2002 | Nakazawa .................. | 318/701 |
| 6,555,985 B1 | * | 4/2003 | Kawabata et al. .......... | 318/685 |
| 6,914,399 B1 | * | 7/2005 | Kushion et al. ............ | 318/434 |

* cited by examiner

*Primary Examiner*—Richard M. Camby
(74) *Attorney, Agent, or Firm*—Michael D. Smith

(57) ABSTRACT

A method and apparatus for limiting current and voltage in a PM electric machine comprising: receiving a command indicative of a desired position control; obtaining a velocity value indicative of the rotational velocity of the electric machine; and computing a first voltage threshold for the electric machine based on a selected operating condition. If the voltage command exceeds the first voltage threshold, the method also includes establishing a modified voltage command as substantially equivalent to the first voltage threshold, otherwise establishing a modified voltage command as substantially equivalent to the voltage command.

17 Claims, 4 Drawing Sheets

CURRENT LIMIT FOR AN ELECTRIC MACHINE

BACKGROUND

Electric Steering applications such as Electric Power Steering (EPS), four wheel steering e.g., Quadrasteer™ (Qsteer) and Active Front Steer (AFS) are used in vehicles to improve performance fuel economy and stability of the vehicle. Commonly, in such systems an electronic controller is configured to drive an electric motor to provide torque, velocity or positioning control.

Steering applications such as AFS and Quadrasteer™ utilize motor position control. It is desirable to use a brushless permanent magnet (PM) motor in such applications for its higher efficiency and high torque density. Generally, the motor can be designed and controlled to exhibit a sinusoidal back EMF (electromotive force), which provides smoother torque feel or a trapezoidal back EMF, which while easier to control, can suffer from commutation ripple and noise. The sinusoidal back EMF motor can be controlled utilizing phase advance, thus further reducing the size of the motor. Therefore, it is often desirable to use brushless permanent magnet motors with sinusoidal back EMF for these applications. Brushless permanent magnet motors can be position controlled employing either current mode control or voltage mode control. Voltage mode control advantageously, provides damping when applied voltage is not compensated for back EMF. In voltage mode control, the voltage command to the motor is primarily a function of application control variables disregarding the motor characteristics. In addition, voltage mode control systems may be desirable in certain applications because the need for external sensors to provide feedback is minimized. Unfortunately, however, with voltage mode control the torque, and therefore, the current flowing through the motor is not measured or controlled. For position control applications using voltage command, the voltage is a direct function of the position error, therefore, a high voltage is applied across the motor winding at high position errors while a small voltage is applied for small position motor irrespective of motor velocity. By the principal of the operation of the motor, the voltage applied across the motor is function of motor torque and the back EMF of the motor. At very low velocity, even small voltage applied across the motor can result into high torques and therefore high current. At higher voltage and low velocity, the torque, and thereby the current of the motor can be several times a motors rating. Steering control systems employing voltage mode control algorithms, generally do not use the motor phase current for torque control. Moreover, it may be beneficial to limit motor torque and current to avoid exceeding motor or controller ratings. While the phase current is readily available for measurement, such measurement would require additional sensors and interfaces. Therefore, in a voltage control system, it may be desirable to constrain maximum voltages and thereby avoid exceeding rated torques and currents without relying upon current sensors or measurements.

BRIEF SUMMARY

Disclosed herein in an exemplary embodiment is a method for limiting current and voltage in a PM electric machine comprising: receiving a voltage command indicative of a desired position control; obtaining a velocity value indicative of the rotational velocity of the electric machine; and computing a first voltage threshold for the electric machine based on a selected operating condition. If the voltage command exceeds the first voltage threshold, the method also includes establishing a modified voltage command as substantially equivalent to the first voltage threshold, otherwise establishing a modified voltage command as substantially equivalent to the voltage command.

Also disclosed herein in yet another exemplary embodiment is a system for limiting current and voltage in a PM electric machine comprising: a PM electric machine; a position sensor configured to measure the rotor position of the electric machine and transmit a position signal; a controller, the controller in operable communication with a voltage source and the electric machine and the position sensor, the controller computing a voltage command responsive to a position control.

If the voltage command exceeds a first voltage threshold, the controller establishes a modified voltage command as substantially equivalent to the first voltage threshold, otherwise the controller establishes a modified voltage command as substantially equivalent to the voltage command.

Further disclosed herein in another exemplary embodiment is a system for limiting current and voltage in a PM electric machine comprising: a means for receiving a voltage command indicative of a desired position control; a means for obtaining a velocity value indicative of the rotational velocity of the electric machine; and a means for computing a first voltage threshold for the electric machine based on a selected operating condition. If the voltage command exceeds the first voltage threshold, the system also includes a means for establishing a modified voltage command as substantially equivalent to the first voltage threshold, otherwise a means for establishing a modified voltage command as substantially equivalent to the voltage command.

Also disclosed herein in yet another exemplary embodiment is a storage medium encoded with a machine-readable computer program code for limiting current and voltage in a PM electric machine, the storage medium including instructions for causing controller to implement the abovementioned methodology.

Disclosed herein in yet another exemplary embodiment is a computer data signal embodied in a carrier wave for limiting current and voltage in a PM electric machine, the data signal comprising code configured to cause a controller to implement the abovementioned methodology.

BRIEF DESCRIPTION OF THE DRAWINGS

The present invention will now be described, by way of an example, with references to the accompanying drawings, wherein like elements are numbered alike in the several figures in which.

DETAILED DESCRIPTION OF THE PREFERRED EMBODIMENT

Electric steering applications such as electric power steering, Quadrasteer and Active Front Steering systems (AFS) often use voltage mode controlled sinusoidal Brushless permanent magnet drives for position control actuators. The voltage mode controlled sinusoidal PM drive used may not include active current measurement. Without an active current measurement, it may be difficult to limit or clamp the current, especially at low velocities. Addition of active phase current sensing is possible but can result into an increase in cost of the drive. Disclosed herein in an exemplary embodiment is a system and methodology for implementing a current limiting clamp without active motor current sensing. An algorithm is presented which estimates the motor voltage as a function of maximum rated motor torque and velocity at each operating point and limits the motor voltage at each operating point.

The disclosed embodiments may be utilized in various types of vehicles employing motor control systems such as may be employed in electronic steering, four wheel steer, active front steer or steer by wire systems. A preferred embodiment, by way of illustration is described herein as it may be applied to an automobile employing a steering system for position control of a steerable wheel. While a preferred embodiment is shown and described by illustration and reference to a motor control system as may be employed in a automobile steering system, it will be appreciated by those skilled in the art that the invention is not limited to the automobiles alone by may be applied to other motor control systems employing electronic motor controls.

Figure 1:
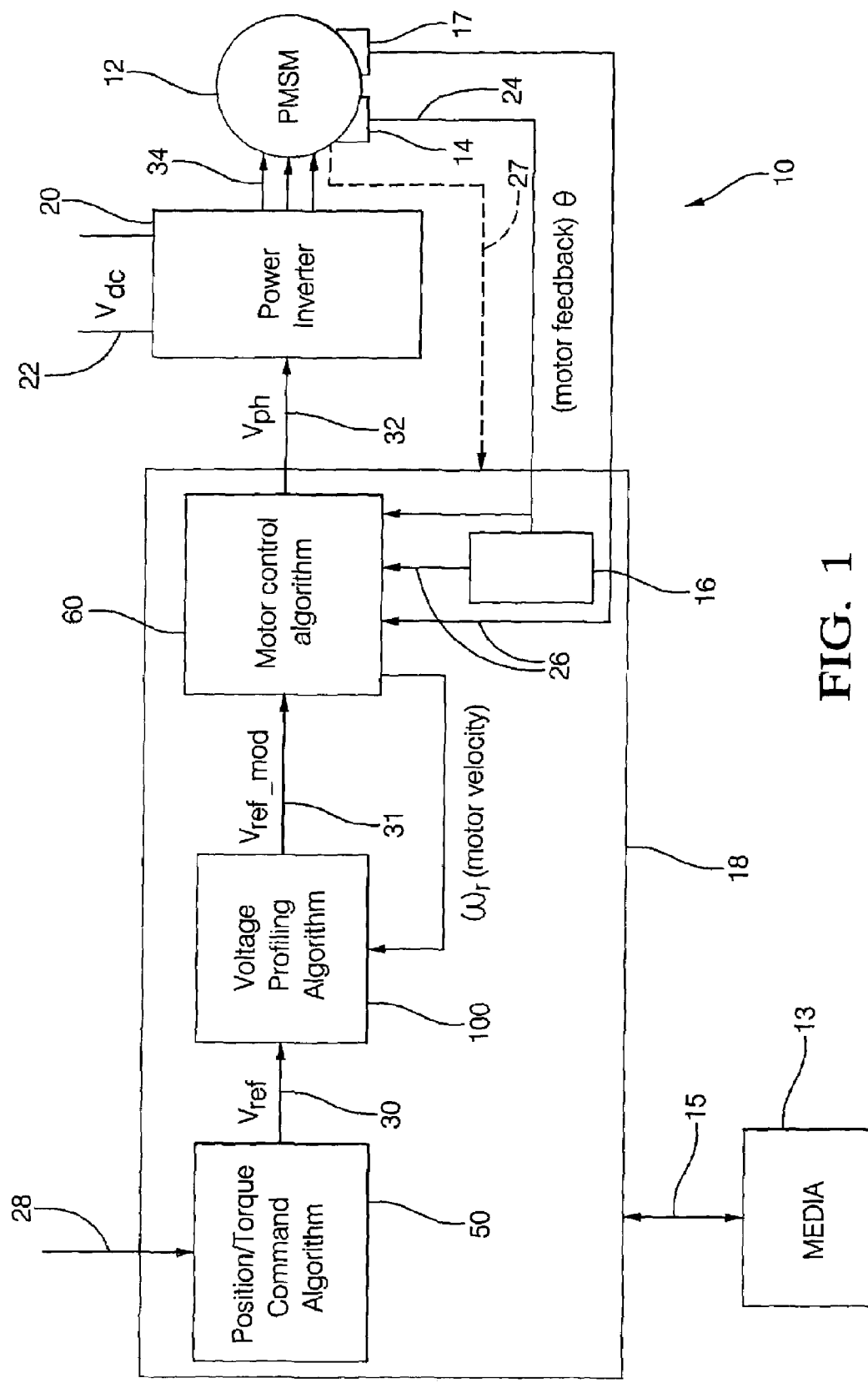
FIG. 1 is a simplified block diagram depicting a motor control system with voltage-profiling in accordance with an exemplary embodiment.

Referring now to the drawings in detail, FIG. 1 depicts a PM motor system 10 where numeral 10 generally indicates a system for controlling the torque, velocity or position of a sinusoidally excited PM electric machine 12 (e.g. a motor, hereinafter referred to as a motor). The system includes, but is not limited to, a motor rotor position encoder 14, an optional velocity measuring circuit 16, an optional velocity sensor 17, a controller 18, power circuit or inverter 20 and power source 22. Controller 18 is configured to develop the necessary voltage(s) out of inverter 20 such that, when applied to the motor 12, the desired response is generated. Because these voltages are related to the position and velocity of the motor 12, the position and velocity of the rotor are determined. A rotor position encoder 14 is connected to the motor 12 to detect the angular position of the rotor denoted θ. The encoder 14 may sense the rotary position based on optical detection, magnetic field variations, or other methodologies. Typical position sensors include potentiometers, resolvers, synchros, encoders, and the like, as well as combinations comprising at least one of the forgoing. The position encoder 14 outputs a position signal 24 indicating the angular position of the rotor.

The motor velocity denoted $\omega_m$ may be measured, calculated or a combination thereof. Typically, the motor velocity ωm is calculated as the change of the motor position θ as measured by a rotor position encoder 14 over a prescribed time interval. For example, motor velocity $\omega_m$ may be determined as the derivative of the motor position θ from the equation $\omega_m = \Delta\theta/\Delta t$ where Δt is the sampling time and Δθ is the change in position during the sampling interval. Another method of determining velocity depending upon the type of encoder employed for the motor position θ, may be to count the position signal pulses for a predetermined duration. The count value is proportional to the velocity of the motor. In the figure, a velocity measuring circuit 16 determines the velocity of the rotor and outputs a velocity signal 26. In yet another option, a velocity sensor 17 may be employed to directly measure the velocity of the motor 12 and provide a velocity signal 26.

The temperature of the motor 12 may be measured utilizing one or more optional temperature sensors located at the motor windings (not shown). The temperature sensor transmits a temperature signal 27 to the controller 18 to facilitate the processing prescribed herein. Typical temperature sensors include thermocouples, thermistors, thermostats, and the like, as well as combinations comprising at least one of the foregoing sensors, which when appropriately placed provide a calibratable signal proportional to the particular temperature.

The position signal 24, velocity signal 26, (optional temperature signal 27), and position control input signals 28 are applied to the controller 18. The position control input signals 28 is representative of the desired position command and feedback input for position control applications. For the position control the controller 18 processes all input signals to generate values corresponding to each of the signals resulting in a rotor position value, a motor velocity value, (an optional temperature value) being available for the processing in the algorithms as prescribed herein. Measurement signals, such as the above mentioned are also commonly linearized, compensated, and filtered as desired or necessary to enhance the characteristics or eliminate undesirable characteristics of the acquired signal. For example, the signals may be linearized to improve processing velocity, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the execution of position control algorithm(s), the voltage clamping process as prescribed herein, and the like), controller 18 may include, but not be limited to, a processor(s), computer(s), memory, storage, register(s), timing, interrupt(s), communication interfaces, and input/output signal interfaces, as well as combinations comprising at least one of the foregoing. For example, controller 18 may include signal input signal filtering to enable accurate sampling and conversion or acquisitions of such signals from communications interfaces. Moreover, controller 18 may include or be implemented with various processors, controllers, microcontrollers, logic/gate arrays, programmable logic arrays (PLA), programmable logic devices, and the like, as well as combinations including any of the foregoing. Additional features of controller 18 and certain processes therein are thoroughly discussed at a later point herein.

The controller 18 determines the voltage command $V_{ref}$ 30 required to develop the desired position control by using the position control input signals 28 and may also be responsive to the position signal 24, velocity signal 26, temperature signal 27 and the like. For a three-phase motor, three sinusoidal reference signals that are synchronized with the motor back EMF $\vec{E}$ are required to generate the required motor input voltages.

In an exemplary embodiment an additional voltage profiling process 100 is interjected in the voltage control loop for a sinusoidally controlled permanent magnet motor 12. A motor voltage command denoted as $V_{ref}$ 30 for a desired position control is commanded from the Position Control Algorithm as depicted at 50. The voltage profiling process 100 receives the voltage command $V_{ref}$ 30 and motor velocity signal 16 and generates a modified voltage command $V_{ref\_mod}$ 31.

The modified voltage command $V_{ref\_mod}$ 31 and motor position θ are fed into the motor control algorithm as depicted at block 60, which generates the PWM switching signal to control the sinusoidal voltage across each phase of the motor. The motor control of process block 60 transforms the modified voltage command signal $V_{ref\_mod}$ 31 into phase commands by determining phase voltage command signals $V_a$, $V_b$, and $V_c$ from the modified voltage command signal $V_{ref\_mod}$ 31 and the position signal 24 according to the following equations:

$$V_a = V_{ref\_mod} \sin(\theta)$$

$$V_b = V_{ref\_mod} \sin(\theta - 120°)$$

$$V_c = V_{ref\_mod} \sin(\theta - 240°)$$

In a motor drive system employing phase advancing, the phase advancing angle denoted as δ may also be calculated as a function of the input signal. The phase voltage signals $V_a$, $V_b$, $V_c$ are then phase shifted by this phase advancing angle δ. Phase voltage command signals $V_a$, $V_b$ and $V_c$ are used to generate the motor duty cycle signals $D_a$, $D_b$, and $D_c$ 32 using an appropriate pulse width modulation (PWM) technique. Motor duty cycle signals 32 [SHOW 32 ON FIGURE] of the controller 18 are applied to a power circuit or inverter 20, which is coupled with a power source 22 to apply phase voltages 34 to the stator windings of the motor in response to the motor voltage command signals.

Figure 2:
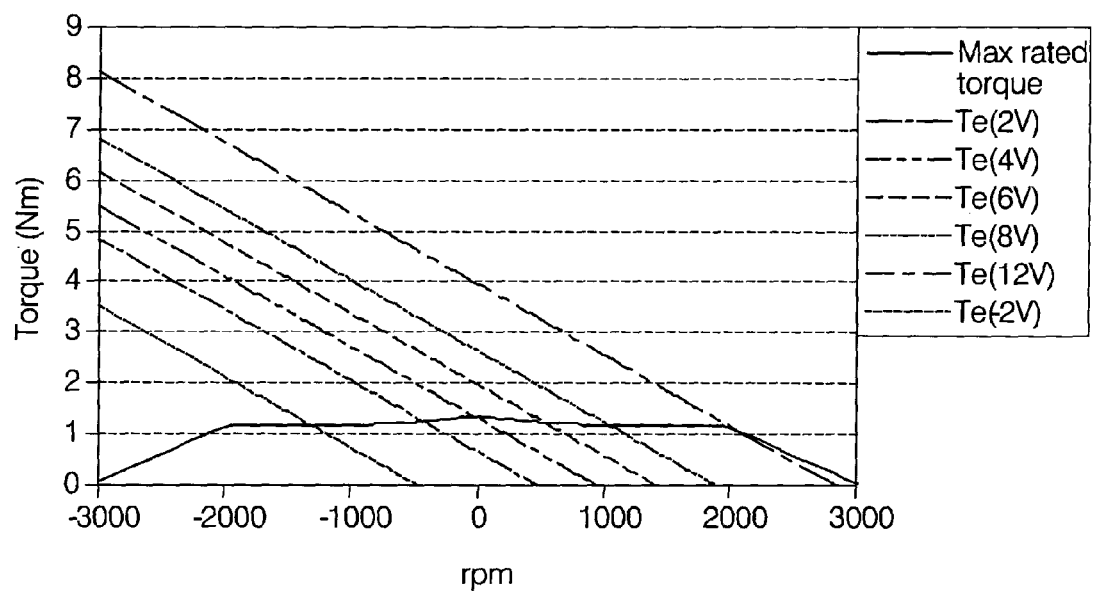
FIG. 2 depicts an illustrative motor torque at different voltages if the torque is allowed to exceed the maximum current/voltage.

Turning now to FIG. 2, the voltage at each operating point of the motor 12 is a function of velocity and torque at that operating point. A maximum rated profile may readily be established for the maximum rated torque as the function of motor velocity. It will be appreciated then that the torque of the motor 12 may be limited to the maximum rated torque independent of the motor voltage. FIG. 2 depicts an illustrative motor torque at different voltages if the torque is allowed to exceed the maximum current/voltage. In this illustration it may readily be observed that the torque of the motor attains almost four times the maximum rated torque at low velocities with an excitation of 12V.

In an exemplary embodiment, the torque of the motor 12 may be limited by limiting the maximum voltage available to be applied to the motor 12 as a function of motor velocity, ω. This may be accomplished by calculating the motor voltage for the maximum torque at a given velocity with the angle δ between the back EMF $\vec{E}$ and the voltage $\vec{V}$ vectors is fixed to a selected value. The maximum voltage across the motor 12 may be computed as:

$$V_{max} = \frac{1}{R\cos\delta + \frac{P}{2}\omega_r L \sin\delta} \left( \frac{R^2 + \left(\frac{P}{2}\omega_r L\right)^2}{3K_e} T_{cmd\,max} + K_e \omega_r R \right) \quad (4)$$

where δ between the back EMF $\vec{E}$ and the terminal voltage $\vec{V}$, $T_{cmd\,max}(\omega_r)$ is the maximum motor torque at velocity $\omega_r$, both negative and positive maximum torque are used in the equation.

$K_e$ is the back EMF constant of the motor,
P is the number of poles in the motor,
R is the motor phase resistance, and
L is the motor phase inductance.

Equation 4 shows the maximum voltage may be computed utilizing known motor parameters and motor operating information. Advantageously, only information regarding motor parameters, rotor velocity, ω and position angle, θ is required for the controller 18 to develop a signal to produce a desired motor response, no current feedback is needed.

In an alternative embodiment for implementation of these equations, a further simplification is made when phase advancing is not used. Under these conditions Equation 4 reduces to:

$$V_{max} = \left( \frac{R^2 + \left(\frac{P}{2}\omega_r L\right)^2}{3K_e R} T_{cmd\,max} + K_e \omega_r \right) \quad (5)$$

Figure 3:
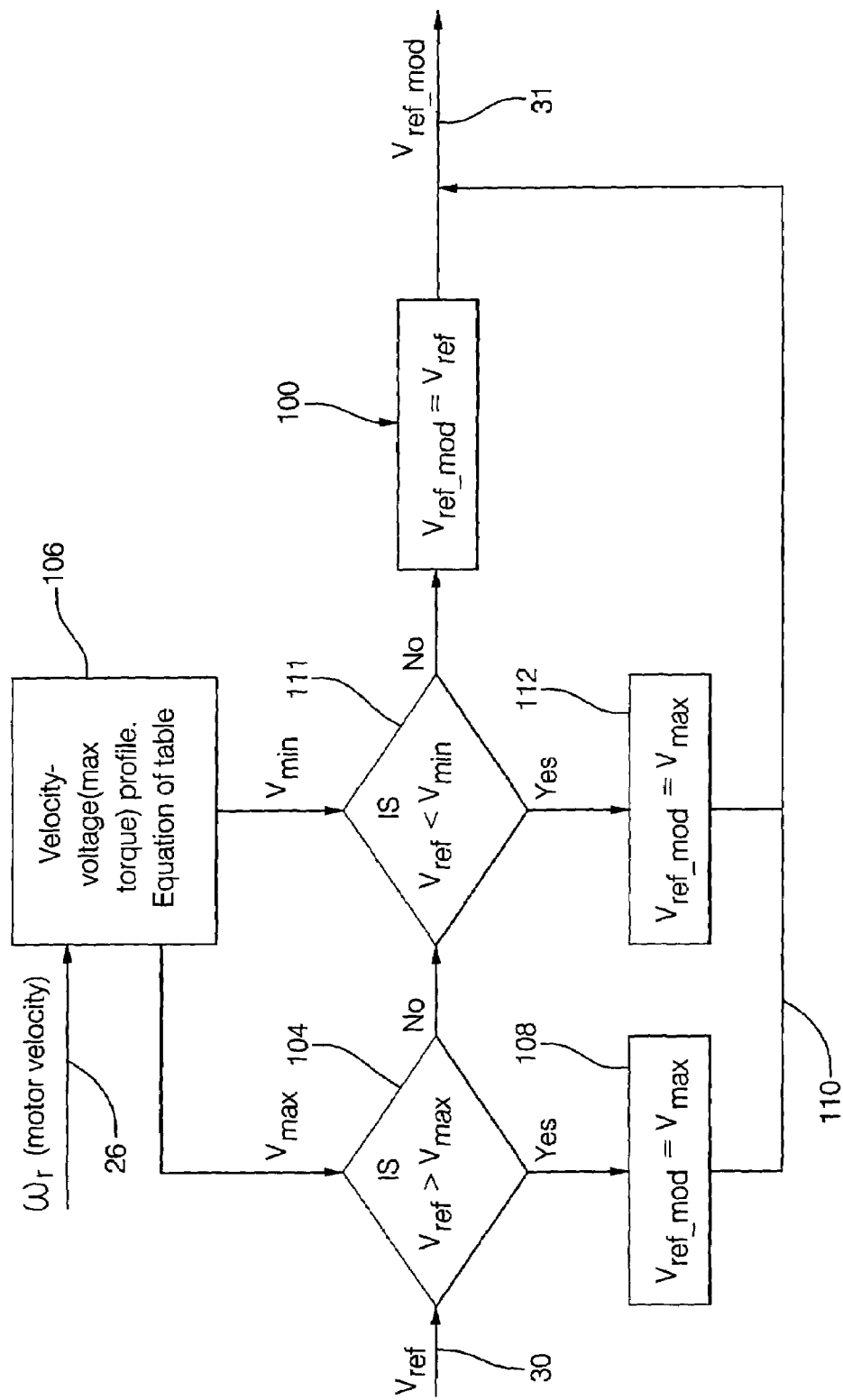
FIG. 3 is a simplified block diagram depicting a voltage-profiling algorithm in accordance with an exemplary embodiment.

FIG. 3 depicts a block diagram of the voltage profile algorithm 100 in accordance with an exemplary embodiment. In the voltage profile process block 106, the maximum permissible voltage $V_{max}$ and minimum permissible voltage $V_{min}$ (voltage corresponding to maximum rated negative torque) are calculated as a function of motor velocity ω fed into the block 106 and positive and negative maximum torque at that velocity. The maximum rated torque profile is used from the machine design parameters, which gives the rated maximum torque (or current) permitted for operation of motor. Alternatively, these values may readily be calculated off line and stored as a look up table indexed as a function of operational parameters, motor velocity for example. Values for $V_{max}$ and $V_{min}$ may also readily be interpolated for instances when a lesser number of points are stored. It will be appreciated that in this instance, maximum and minimum correlate with direction of the torque commands and velocity. That is, maximum voltage corresponds with a maximum rated torque for one direction, while minimum voltage corresponds with a maximum rated torque for the opposite direction.

At decision block 104, the voltage command, $V_{ref}$ 30 is compared to maximum voltage $V_{max}$ fed from a voltage profile process block 106. If the voltage command, $V_{ref}$ 30 is greater than the maximum voltage $V_{max}$ for a particular operating point a modified voltage command denoted $V_{ref\_mod}$ 31 is set equal to maximum voltage $V_{max}$, as depicted at process block 108. Otherwise, the voltage command $V_{ref}$ 30 is transmitted into second decision block 111. At the decision block 111, the voltage command $V_{ref}$ 30 is compared to minimum voltage $V_{min}$ fed from the voltage profile process block 106. If the voltage command $V_{ref}$ 30 is less than the minimum voltage $V_{min}$ for a particular operating point, the modified voltage command denoted $V_{ref\_mod}$ 31 is set equal to minimum voltage $V_{min}$, as depicted at process block 112. Otherwise the modified voltage command $V_{ref\_mod}$ 31 is set equal to $V_{ref}$ 30 as depicted at process block 110. It will be appreciated that the process and decision blocks and comparison of the voltages can be implemented by numerous other methods. It should be understood that the methodology of the disclosed embodiments provide a methodology for performing the comparison, it should now be apparent that other methods are conceivable.

Figure 4:
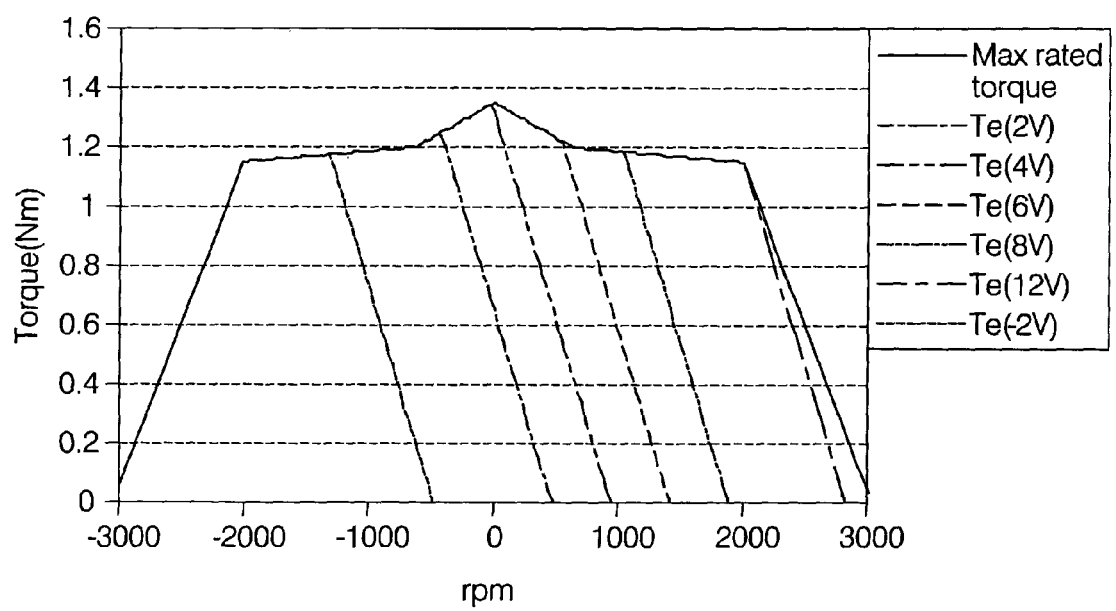
FIG. 4 depicts an illustrative motor torque at different voltages if the torque is limited to the maximum current/voltage.
Figure 5:
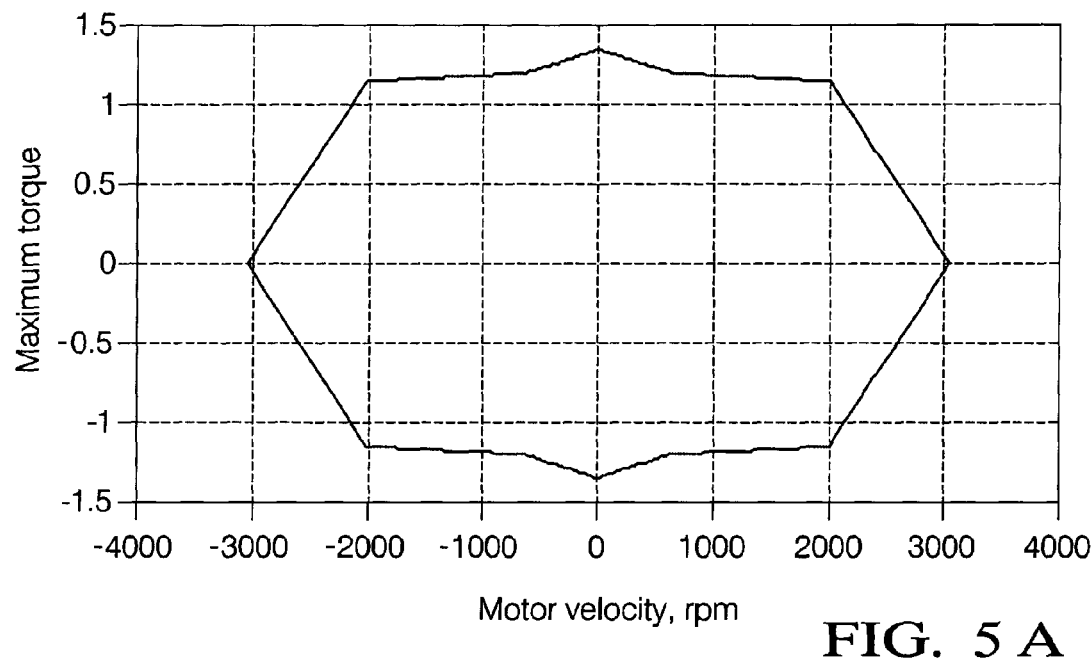
FIG. 5A show an exemplary torque velocity profile for a motor in all four quadrants of operation.
FIG. 5B show the operation voltage boundaries for this motor.
Figure 5:
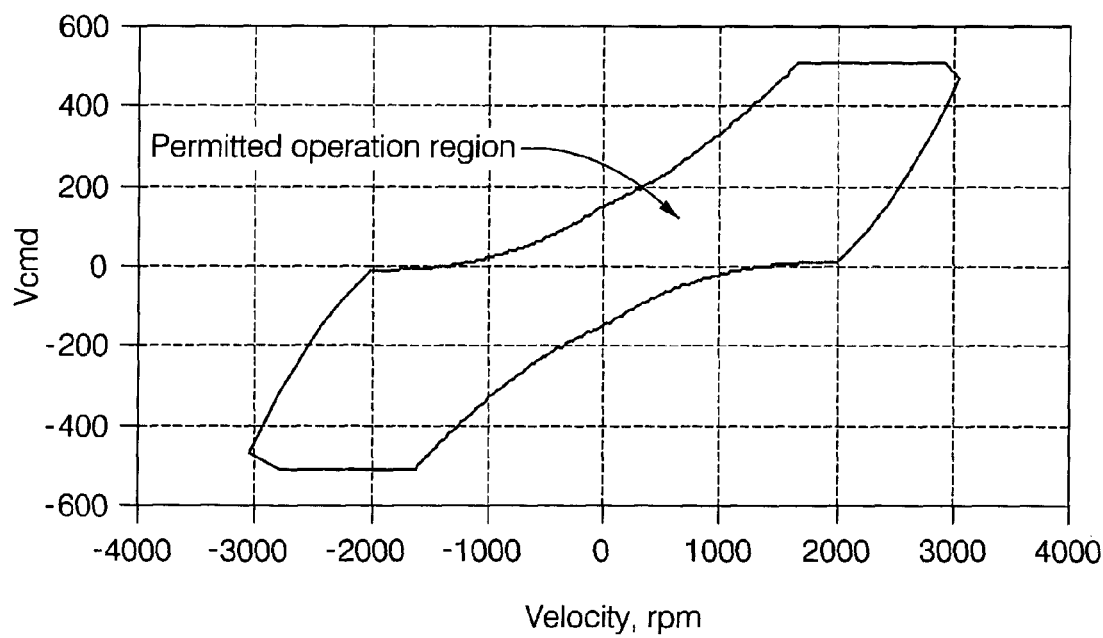

FIG. 4 depicts an illustration of output torque of the motor 12 at different voltage commands including the voltage limiting of an exemplary embodiment. It may readily be appreciated that the torque of the motor 12 is always within the maximum velocity torque profile of the motor 12. Moreover, it may be seen that the torque is limited to the maximum profile at the points where it hits that bound and is allowed follow it own trajectory when it is within the bound. FIG. 5A show the torque velocity profile for the motor considered in this application in all four quadrants of operation. FIG. 5B shows the rated operation range voltage boundaries calculated equation (5) for this motor.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller 18, the computer becomes an apparatus for practicing the invention. The present invention can also be embodied in the form of computer program code embodied as a data signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for limiting current and voltage in a PM electric machine comprising:
   receiving a voltage command indicative of a desired position control;
   computing a first voltage threshold for said electric machine based on a selected operating condition; and
   if said voltage command exceeds said first voltage threshold, establishing a modified voltage command as substantially equivalent to said first voltage threshold, otherwise establishing a modified voltage command as substantially equivalent to said voltage command, wherein at least one of said voltage command and said first voltage threshold being based on temperature.

2. The method of claim 1 wherein said first voltage threshold corresponds to a selected maximum voltage for said electric machine at said selected operating condition.

3. The method of claim 2 wherein said selected operating condition includes a velocity of said electric machine.

4. The method of claim 2 wherein said selected operating condition includes a rated torque profile of said electric machine.

5. The method of claim 1 further including computing a second voltage threshold for said electric machine based on another selected operating condition; and
   if said voltage command is less than said second voltage threshold, establishing said modified voltage command as substantially equivalent to said second voltage threshold, otherwise establishing said modified voltage command as substantially equivalent to said voltage command.

6. A method for limiting current and voltage in a PM electric machine comprising:
   receiving a voltage command indicative of a desired position control;
   computing a first voltage threshold for said electric machine based on a selected operating condition; and
   if said voltage command exceeds said first voltage threshold, establishing a modified voltage command as substantially equivalent to said first voltage threshold, otherwise establishing a modified voltage command as substantially equivalent to said voltage command;
   computing a second voltage threshold for said electric machine based on another selected operating condition, said second voltage threshold corresponding to a selected minimum voltage for said electric machine at said another selected operating condition; and
   if said voltage command is less than said second voltage threshold, establishing said modified voltage command as substantially equivalent to said second voltage threshold, otherwise establishing said modified voltage command as substantially equivalent to said voltage command.

7. The method of claim 6 wherein said another selected operating condition includes a velocity of said electric machine.

8. The method of claim 6 wherein said another selected operating condition includes a rated torque profile of said electric machine.

9. A system for limiting current and voltage in a PM electric machine comprising:
   a PM electric machine;
   a position sensor configured to measure a position of said electric machine and transmit a position signal;
   a controller in operable communication with a voltage source and said electric machine and said position sensor, said controller computing a voltage command responsive to a desired position control;
   wherein if said voltage command exceeds a first voltage threshold, said controller establishes a modified voltage command as substantially equivalent to said first voltage threshold, otherwise said controller establishes a modified voltage command as substantially equivalent to said voltage command, wherein at least one of said voltage command, said first voltage threshold, and said second voltage threshold being based on temperature.

10. The system of claim 9 further including an inverter in operable communication between said voltage source and said electric machine, said inverter also in operable communication with said controller and configured to generate a phase voltage to said electric machine based on said modified voltage command.

11. The system of claim 9 wherein said first voltage threshold corresponds to a selected maximum voltage for said electric machine at a selected operating condition.

12. The system of claim 11 wherein said selected operating condition includes a velocity of said electric machine.

13. The system of claim 11 wherein said selected operating condition includes a rated torque profile of said electric machine.

14. The system of claim 9 further including: if said voltage command is less than a second voltage threshold, said controller establishes said modified voltage command as substantially equivalent to said second voltage threshold, otherwise said controller establishes said modified voltage command as substantially equivalent to said voltage command.

15. A system for limiting current and voltage in a PM electric machine comprising:
   a PM electric machine;
   a position sensor configured to measure a position of said electric machine and transmit a position signal;
   a controller in operable communication with a voltage source and said electric machine and said position sensor, said controller computing a voltage command responsive to a desired position control;
   wherein if said voltage command exceeds a first voltage threshold, said controller establishes a modified voltage command as substantially equivalent to said first voltage threshold, otherwise said controller establishes a modified voltage command as substantially equivalent to said voltage command; and if said voltage command is less than a second voltage threshold, said controller establishes said modified voltage command as substantially equivalent to said second voltage threshold, otherwise said controller establishes said modified voltage command as substantially equivalent to said voltage command, said second voltage threshold corresponding to a selected minimum voltage for said electric machine at a first selected operating condition.

16. The system of claim 15 wherein said first selected operating condition includes a velocity of said electric machine.

17. The system of claim 15 wherein said first selected operating condition includes a rated torque profile of said electric machine.

* * * * *